United States Patent
Han et al.

(10) Patent No.: US 9,438,910 B1
(45) Date of Patent: Sep. 6, 2016

(54) AFFINE MOTION PREDICTION IN VIDEO CODING

(71) Applicant: Google Inc., Mountain View, CA (US)

(72) Inventors: Jingning Han, Santa Clara, CA (US); Hui Su, College Park, CA (US); Yaowu Xu, Saratoga, CA (US)

(73) Assignee: GOOGLE INC., Mountain View, CA (US)

( * ) Notice: Subject to any disclaimer, the term of this patent is extended or adjusted under 35 U.S.C. 154(b) by 355 days.

(21) Appl. No.: 14/204,100

(22) Filed: Mar. 11, 2014

(51) Int. Cl.
H04N 11/02 (2006.01)
H04N 19/583 (2014.01)
H04N 19/61 (2014.01)

(52) U.S. Cl.
CPC .. *H04N 19/00733* (2013.01); *H04N 19/00781* (2013.01)

(58) Field of Classification Search
None
See application file for complete search history.

(56) References Cited

U.S. PATENT DOCUMENTS

| | | | |
|---|---|---|---|
| 6,275,532 B1 | 8/2001 | Hibi et al. | |
| 6,674,479 B2 | 1/2004 | Cook et al. | |
| 6,711,211 B1 | 3/2004 | Lainema | |
| 7,298,379 B2 | 11/2007 | Xu et al. | |
| 7,526,028 B2 | 4/2009 | Sung et al. | |
| 7,580,456 B2 | 8/2009 | Li et al. | |
| 7,961,784 B2 | 6/2011 | Demos | |
| 7,970,206 B2 | 6/2011 | Harris et al. | |
| 8,005,144 B2 | 8/2011 | Ji et al. | |
| 8,014,611 B2 | 9/2011 | Morohashi | |
| 8,259,809 B2 | 9/2012 | Lin | |
| 8,767,825 B1 | 7/2014 | Wang et al. | |
| 8,780,976 B1 | 7/2014 | Jia | |
| 8,947,449 B1 | 2/2015 | Dodd | |
| 2003/0067560 A1* | 4/2003 | Suzuki | H04N 5/262 348/578 |

(Continued)

FOREIGN PATENT DOCUMENTS

| | | |
|---|---|---|
| EP | 0765087 A2 | 8/1996 |
| EP | 1206881 B1 | 10/2000 |

(Continued)

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Frederick Bailey
(74) *Attorney, Agent, or Firm* — Young Basile Hanlon & MacFarlane, P.C.

(57) ABSTRACT

A block of a video frame may be predicted and encoded using a local affine motion prediction scheme. At least three points within the video frame are selected, each point being adjacent to a respective corner of the current block to be encoded. For each point, a motion search is performed for a template block centered about the point within a reference frame to find a template reference block. The template reference block has a center point that forms an anchor point pair with the corresponding point adjacent to the current block. Using coordinates of the anchor point pairs, affine coefficients for an affine transformation are generated. Using the affine transformation, a prediction block for the current block is generated and used to encode the current block within a bitstream. Providing the local affine motion prediction scheme can improve the prediction of certain blocks with complex motion, increasing compression.

20 Claims, 7 Drawing Sheets

(56) References Cited

U.S. PATENT DOCUMENTS

| | | | |
|---|---|---|---|
| 2004/0190613 A1* | 9/2004 | Zhu | H04N 19/533 375/240.22 |
| 2005/0201464 A1 | 9/2005 | Lee | |
| 2006/0083311 A1* | 4/2006 | Winger | H04N 19/577 375/240.16 |
| 2006/0120459 A1 | 6/2006 | Park et al. | |
| 2007/0002048 A1 | 1/2007 | Takashima et al. | |
| 2007/0058718 A1 | 3/2007 | Shen et al. | |
| 2008/0089417 A1 | 4/2008 | Bao et al. | |
| 2008/0247462 A1 | 10/2008 | Demos | |
| 2008/0260031 A1 | 10/2008 | Karczewicz | |
| 2009/0116557 A1 | 5/2009 | Nair | |
| 2009/0207915 A1 | 8/2009 | Yan et al. | |
| 2011/0026820 A1 | 2/2011 | Strom et al. | |
| 2011/0085027 A1 | 4/2011 | Yamashita et al. | |
| 2011/0122950 A1* | 5/2011 | Ji | H04N 19/563 375/240.16 |
| 2011/0170006 A1 | 7/2011 | Evans et al. | |
| 2011/0182357 A1 | 7/2011 | Kim et al. | |
| 2011/0216968 A1 | 9/2011 | Fillion et al. | |
| 2011/0235930 A1 | 9/2011 | Kim et al. | |
| 2011/0249734 A1 | 10/2011 | Segall et al. | |
| 2011/0261886 A1 | 10/2011 | Suzuki et al. | |
| 2012/0163464 A1 | 6/2012 | Edelhaeusser et al. | |
| 2013/0027584 A1 | 1/2013 | Zerwick | |
| 2013/0148721 A1* | 6/2013 | Chen | G09G 5/001 375/240.12 |
| 2013/0177084 A1 | 7/2013 | Wang et al. | |
| 2014/0211858 A1 | 7/2014 | Zhao et al. | |
| 2014/0363096 A1* | 12/2014 | Zhou | G06T 7/0028 382/284 |

FOREIGN PATENT DOCUMENTS

| | | |
|---|---|---|
| GB | 2317525 A | 3/1998 |
| WO | WO 97/40628 A1 | 10/1997 |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
Bankoski et al. "VP8 Data Format and Decoding Guide; draft-bankoski-vp8-bitstream-02" Network Working Group. Dated May 18, 2011.
Bankoski et al. "Technical Overview of VP8, an Open Source Video Codec for the Web". Dated Jul. 11, 2011.
Bankoski, J., Koleszar, J., Quillio, L., Salonen, J., Wilkins, P., and Y. Xu, "VP8 Data Format and Decoding Guide", RFC 6386, Nov. 2011.
Mozilla, "Introduction to Video Coding Part 1: Transform Coding", Video Compression Overview, Mar. 2012, 171 pp.
U.S. Appl. No. 13/351,928, filed Jan. 17, 2012.
Cheung, H. K. and W.C. Siu, "Local affine motion prediction for h.264 without extra overhead," in IEEE Int. Symposium on circuits and Systems (ISCAS), 2010.
J. Han, A. Saxena, V. Melkote and K. Rose, "Jointly Optimized Spatial Prediction and Block Transform for video and Image Coding," IEEE Transaction on Image Processing, vol. 21, No. 4, pp. 1874-1884, Apr. 2012.
Chen, Michael C., et al.; "Design and Optimization of a Differentially Coded Variable Block Size Motion Compensation System", IEEE 1996, 4 pp.
Chen, Xing C., et al.; "Quadtree Based Adaptive Lossy Coding of Motion Vectors", IEEE 1996, 4 pp.
Ebrahimi, Touradj, et al.; "Joint motion estimation and segmentation for very low bitrate video coding", SPIE vol. 2501, 1995, 12 pp.
Guillotel, Philippe, et al.; "Comparison of motion vector coding techniques", SPIE vol. 2308, 1994, 11 pp.
Karczewicz, Maria, et al.; "Video Coding Using Motion Compensation With Polynomial Motion Vector Fields", IEEE COMSOC EURASIP, First International Workshop on Wireless Image/Video Communications—Sep. 1996, 6 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Liu, Bede, et al.; "A simple method to segment motion field for video coding", SPIE vol. 1818, Visual Communications and Image Processing 1992, 10 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 1997, 10 pp.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

(56) References Cited

OTHER PUBLICATIONS

Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.

Steliaros, Michael K., et al.; "Locally-accurate motion estimation for object-based video coding", SPIE vol. 3309, 1997, 11 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Strobach, Peter; "Tree-Structured Scene Adaptive Coder", IEEE Transactions on Communications, vol. 38, No. 4, Apr. 1990, 10 pp.

R. C. Kordasiewicz, M. D. Gallant and S. Shirani, "Affine motion prediction based on translational motion vectors," IEEE Trans. Circuits Syst. Video Technol., vol. 17, No. 10, pp. 1388-1394, Oct. 2007.

H.K. Cheung and W.C. Siu, "Local affine motion prediction for h.264 without extra overhead," in IEEE Int. Symposium on Circuits and Systems (ISCAS), 2010.

N. Zhang, X. Fan, D. Zhao and W. Gao, "Motion vector derivation of deformable block," in IEEE Int. Conf. Image Proc. (ICIP), Sep. 2012.

J. Han, A. Saxena, V. Melkote and K. Rose, "Jointly Optimized Spatial Prediction and Block Transform for Video and Image Coding," IEEE Transactions on Image Processing, vol. 21, No. 4, pp. 1874-1884, Apr. 2012.

\* cited by examiner

AFFINE MOTION PREDICTION IN VIDEO CODING

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. Real-time video streaming, multi-point video conferencing or video broadcasting are examples of applications that employ video stream encoding including compression.

SUMMARY

This disclosure relates in general to inter prediction in video coding and more particularly to affine motion prediction. One method for encoding a video frame described herein includes selecting at least three points within the video frame, each point of the at least three points adjacent to a respective corner of a current block to be encoded, the current block being one of a plurality of blocks of the video frame, for each point of the at least three points, and performing a motion search for a template block centered about the point within a reference frame to find a template reference block, the template reference block having a center point forming an anchor point pair with the point of the at least three points. The method also includes, using coordinates of the anchor point pairs, generating affine coefficients for an affine transformation; and using the affine transformation, generating a prediction block for the current block. Finally, the method includes encoding the current block within an encoded bitstream using the prediction block.

An apparatus for encoding a video frame described herein includes a memory and a processor. According to one implementation, the processor is configured to execute instructions stored in the memory to select at least three points within the video frame. Each point of the at least three points is adjacent to a respective corner of a current block to be encoded, and the current block is one of a plurality of blocks of the video frame. The instructions also cause the memory to, for each point of the at least three points, perform a motion search for a template block centered about the point within a reference frame to find a template reference block, the template reference block having a center point forming an anchor point pair with the point of the at least three points, using coordinates of the anchor point pairs, generate affine coefficients for an affine transformation, using the affine transformation, generate a prediction block for the current block, and encode the current block within an encoded bitstream using the prediction block.

Variations in these and other aspects of this disclosure will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
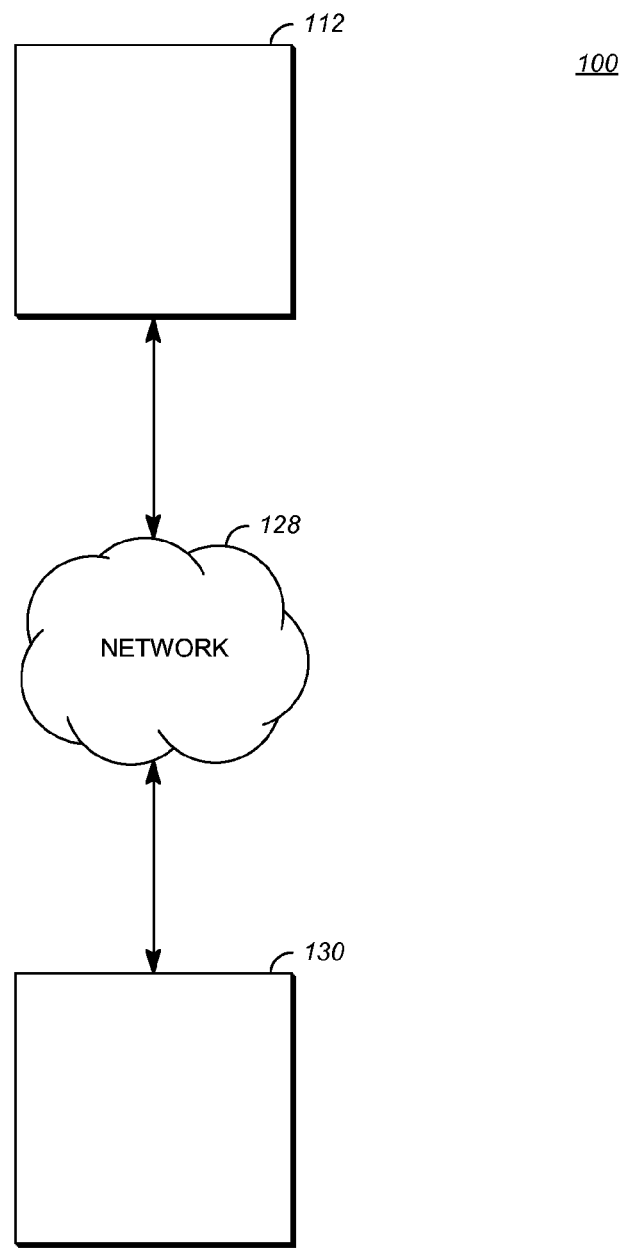
FIG. 1 is a schematic of a video encoding and decoding system.

A video stream may be compressed by a variety of techniques to reduce bandwidth required transmit or store the video stream. A video stream can be encoded, which can involve compression, and then transmitted to a decoder that can decode or decompress the video stream to prepare it for viewing or further processing. Techniques for encoding video streams include prediction, which attempts to predict the pixel values of a block of a frame of a video stream using either pixels peripheral to the block to be predicted, called intra prediction, or attempts to predict the pixel values of a block using a possibly displaced block or blocks from a temporally nearby frame or frames, called inter prediction. The displacement in inter prediction is represented by a motion vector. Whether inter prediction or intra prediction is used, a prediction block is generated and subtracted from the block to be encoded to form a residual block representing the difference between the blocks. The residual block can be further encoded to reduce the number of bits to be included in the output encoded video bitstream in comparison to encoding the original block while maintaining the quality of the decoded video stream.

In inter prediction, the process of find the reference block that best resembles the current block (i.e., the one to be coded) is generally referred to as a motion search. Motion searching is one of the most computationally intensive steps in the encoding process. The accuracy of a motion search (i.e., its ability to find a good reference block) significantly affects the overall compression performance of an encoder. The motion search often uses a translational model. That is, the best matching block is found by matching a block having the same two-dimensional orientation of an image frame.

The translational model of motion prediction works well when the motion in the video is relatively simple. However, the translational model can provide poor predictions for complex motion patterns because it assumes every pixel in a block undergoes the same motion.

The teachings herein instead use a local affine motion prediction scheme. Affine transformation is a linear transform between the coordinates of two spaces that is determined by six affine coefficients. While the affine transformation may include translational motion, it can also encompass scaling, rotation and shearing. Therefore, an affine motion model is able to capture more complex motion than the conventional translational model. In the local affine motion prediction scheme described herein, an affine transformation is fitted between a block to be predicted and pixel data within a reference frame. The affine coefficients can be estimated using reconstructed pixels adjacent to prediction block, eliminating the need of to send overhead information. More details can be had by first referring to an environment in which the teachings herein may be implemented and by then referring to a process implementing the teachings.

FIG. 1 is a schematic of a video encoding and decoding system 100. An exemplary transmitting station 112 can be, for example, a computer having an internal configuration of hardware such as that described in FIG. 2. However, other suitable implementations of transmitting station 112 are possible. For example, the processing of transmitting station 112 can be distributed among multiple devices.

A network 128 can connect transmitting station 112 and a receiving station 130 for encoding and decoding of the video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
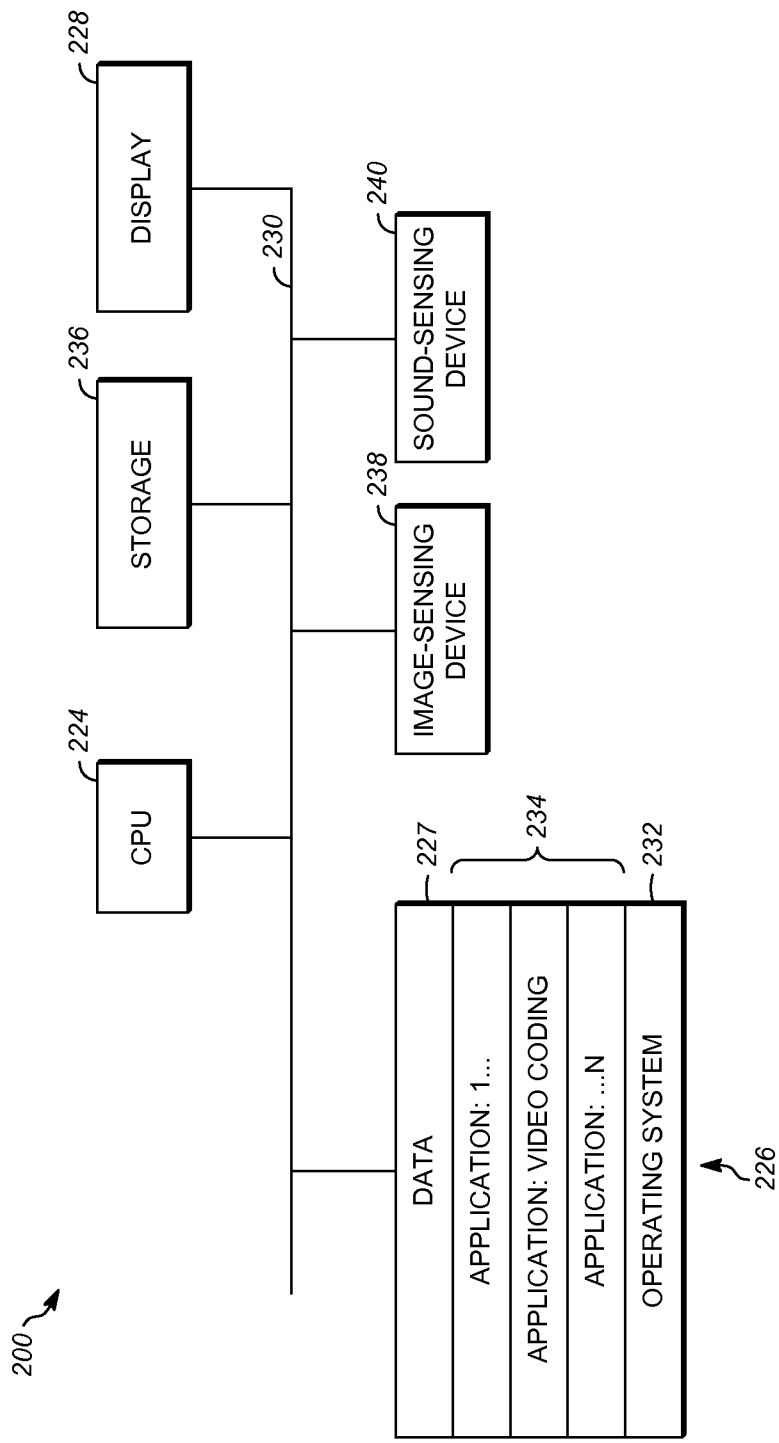
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol.

When used in a video conferencing system, for example, transmitting station 112 and/or receiving station 130 may include the ability to both encode and decode a video stream as described below. For example, receiving station 130 could be a video conference participant who receives an encoded video bitstream from a video conference server (e.g., transmitting station 112) to decode and view and further encodes and transmits its own video bitstream to the video conference server for decoding and viewing by other participants.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. For example, application programs 234 can include applications 1 through N, which further include a video coding application that performs the methods described here. Computing device 200 can also include a secondary storage 236 that can, for example, be a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) display or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
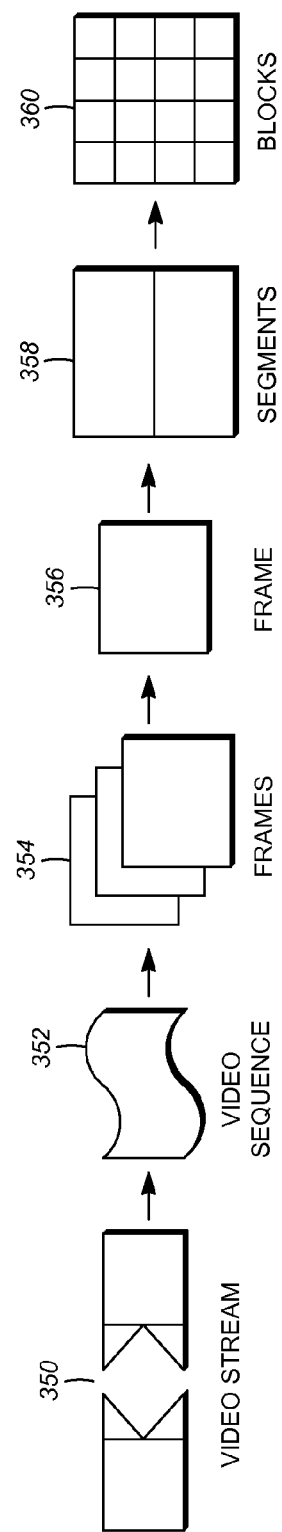
FIG. 3 is a diagram of a typical video stream to be encoded and subsequently decoded.

FIG. 3 is a diagram of an example of a video stream 350 to be encoded and subsequently decoded. Video stream 350 includes a video sequence 352. At the next level, video sequence 352 includes a number of adjacent frames 354. While three frames are depicted as adjacent frames 354, video sequence 352 can include any number of adjacent frames 354. Adjacent frames 354 can then be further subdivided into individual frames, e.g., a single frame 356. At the next level, a single frame 356 can be divided into a series of segments or planes 358. Segments (or planes) 358 can be subsets of frames that permit parallel processing, for example. Segments 358 can also be subsets of frames that separate the video data into different color components. For example, a frame 356 of color video data can include a luminance plane and two chrominance planes. Segments 358 may be sampled at different resolutions.

Whether or not frame 356 is divided into segments 358, frame 356 may be further subdivided into blocks 360, which can contain data corresponding to, for example, 16×16 pixels in frame 356. Blocks 360 can also be arranged to include data from one or more planes of pixel data. Blocks 360 can also be of any other suitable size such as 4×4, 8×8 16×8, 8×16, 16×16 or larger. Unless otherwise noted, the terms macroblock and block used interchangeably herein. Sub-blocks refer to two or more blocks formed by partitioning a larger block and processes described in encoding and decoding a block generally apply to sub-blocks of the block when the block is partitioned into sub-blocks.

Figure 4:
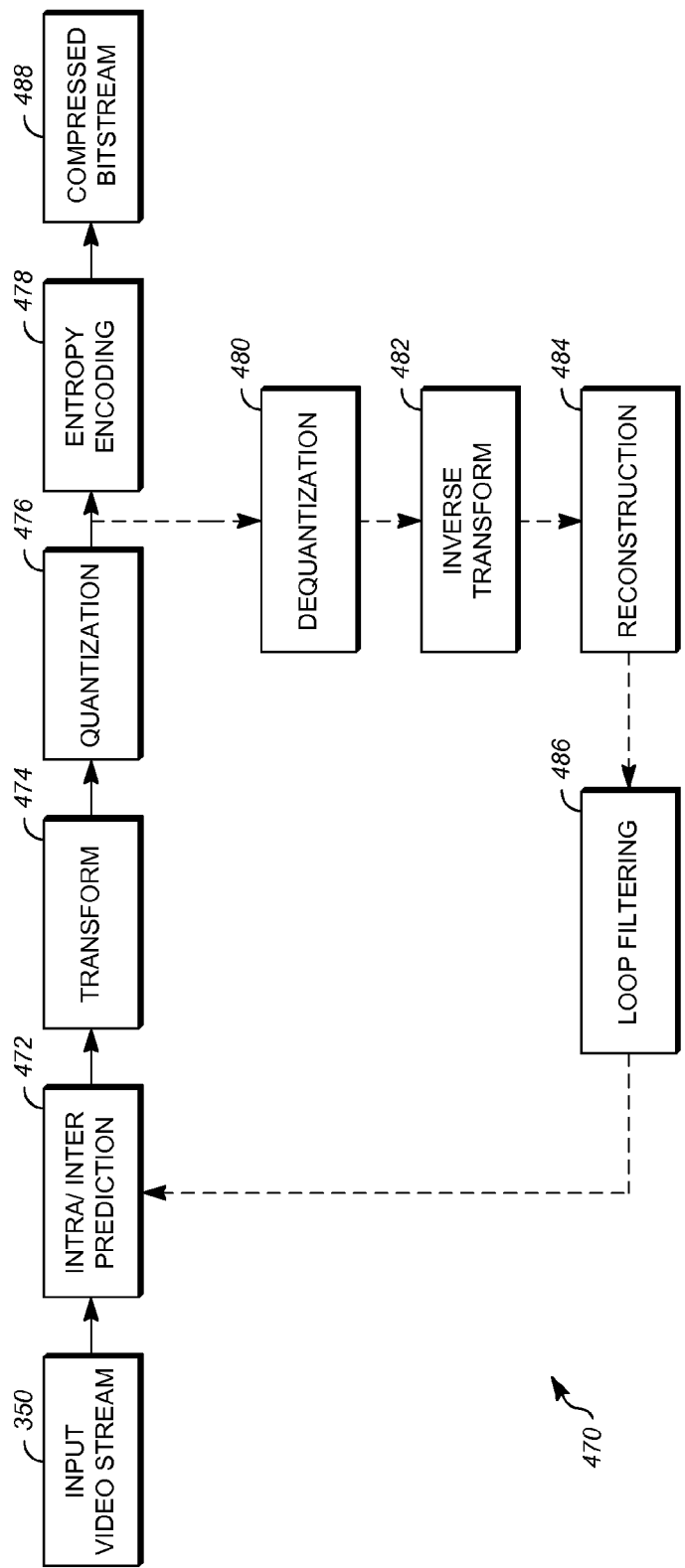
FIG. 4 is a block diagram of a video compression system in according to an implementation of the teachings herein.

FIG. 4 is a block diagram of an encoder 470 in accordance with an implementation of the teachings herein. Encoder 470 can be implemented, as described above, in transmitting station 112 such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included in, for example, transmitting station 112. Encoder 470 has the following stages to perform the various functions in a forward path (shown by the solid connection lines) to produce an encoded or compressed bitstream 488 using input video stream 350: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 4, encoder 470 has the following stages to perform the various functions in the reconstruction path: a dequantization stage 480, an inverse transform stage 482, a reconstruction stage 484, and a loop filtering stage 486. Other structural variations of encoder 470 can be used to encode video stream 350.

When video stream 350 is presented for encoding, each frame 356 can be processed in units of blocks. At the intra/inter prediction stage 472, each block can be encoded using intra-frame prediction (also called intra prediction) or inter-frame prediction (also called inter prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames in association with a motion vector.

Next, still referring to FIG. 4, the prediction block can be subtracted from the current block at intra/inter prediction stage 472 to produce a residual block (also called a residual). Transform stage 474 transforms the residual into transform coefficients in, for example, the frequency domain. Examples of block-based transforms include the Karhunen-Loeve Transform (KLT), the Discrete Cosine Transform (DCT), the Singular Value Decomposition Transform (SVD) and the Asymmetric Discrete Sine Transform (ADST). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix. Note that the size of the prediction block may be different from the size of the transform block due to variable partitioning.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which may include for example the type of prediction used, motion vectors and quantizer value, are then output to the compressed bitstream 488. Compressed bitstream 488 can be formatted using various techniques, such as variable length coding (VLC) or arithmetic coding. Compressed bitstream 488 can also be referred to as an encoded video stream or encoded video bitstream and the terms will be used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including dequantizing the quantized transform coefficients at dequantization stage 480 and inverse transforming the dequantized transform coefficients at inverse transform stage 482 to produce a derivative residual block (also called a derivative residual). At reconstruction stage 484, the prediction block that was predicted at intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474 for certain blocks or frames. In another implementation, an encoder 470 can have quantization stage 476 and dequantization stage 480 combined into a single stage.

Figure 5:
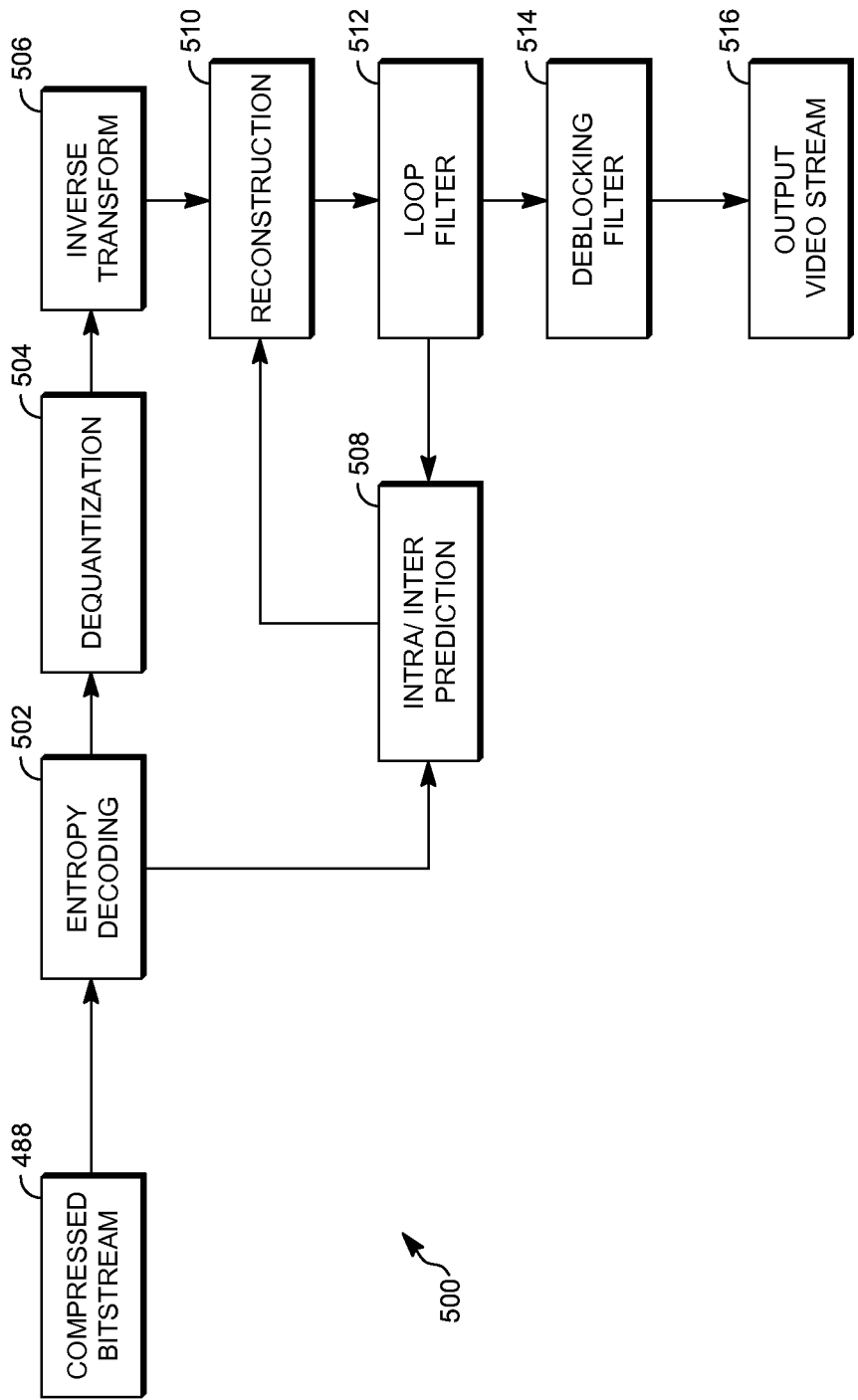
FIG. 5 is a block diagram of a video decompression system in according to an implementation of the teachings herein.

FIG. 5 is a block diagram of a decoder 500 in accordance with another implementation of the teachings herein. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5.

Decoder 500 can also be implemented in hardware included in, for example, transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of decoder 500 can be used to decode compressed bitstream 488.

When compressed bitstream 488 is presented for decoding, the data elements within compressed bitstream 488 can be decoded by entropy decoding stage 502 (using, for example, arithmetic coding) to produce a set of quantized transform coefficients. Dequantization stage 504 dequantizes the quantized transform coefficients, and inverse transform stage 506 inverse transforms the dequantized transform coefficients to produce a derivative residual that can be identical to that created by inverse transform stage 482 in encoder 470. Using header information decoded from compressed bitstream 488, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Loop filtering stage 512 can be applied to the reconstructed block to reduce blocking artifacts. Other filtering can be applied to the reconstructed block. In this example, deblocking filtering stage 514 is applied to the reconstructed block to reduce blocking distortion, and the result is output as output video stream 516. Output video stream 516 can also be referred to as a decoded video stream, and the terms will be used interchangeably herein.

Other variations of decoder 500 can be used to decode compressed bitstream 488. For example, decoder 500 can produce output video stream 516 without deblocking filtering stage 514.

As part of the processes described above, e.g., in inter/intra prediction stage 472, a rate-distortion loop is performed to determine the most efficient coding mode for each block, including its best prediction mode and partition mode, for example. Motion search is part of this loop in assessing inter prediction modes. A rate-distortion loop determines the rate, or number of bits output from the encoding process versus the distortion, or change in visual quality of the video stream as a result of encoding and decoding. Distortion can be measured in a number of different ways including measuring the mean squared error (difference) between the data of the video stream before encoding and decoding and the data of the video stream following encoding and decoding. Thus, rate distortion can measure the number of bits required to represent an encoded block (or other subdivision of a video stream) for a given level of distortion. Relevant to a motion search, a rate-distortion loop can measure the rate distortion for more than one motion search for a given block, thereby permitting the selection of the motion search that provides the best prediction for that block. The local affine motion prediction scheme described herein with reference to FIG. 6 may be performed within a conventional rate-distortion loop or separately with its results provided to the rate-distortion loop to determine the best prediction mode and, if any, motions vector(s).

Figure 6:
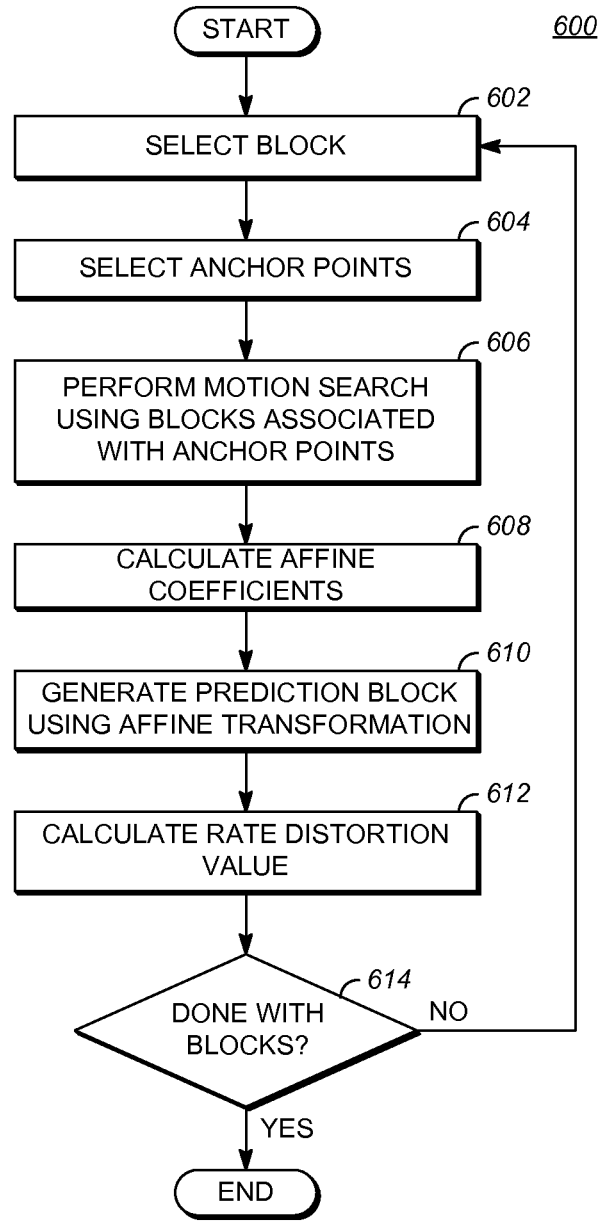
FIG. 6 is a flowchart diagram of a process for encoding a block of a video frame according to an implementation of the teachings herein.

FIG. 6 is a flowchart diagram of a process 600 for encoding a block of a video frame according to an implementation of the teachings herein. In particular, process 600 uses a local affine motion prediction scheme in video coding. Process 600 can be implemented in a system such as computing device 200 to code a video stream. Process 600 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 600. Process 600 can also be implemented using hardware in whole or in part. As explained above, some computing devices may have multiple memories and multiple processors, and the steps of process 600 may in such cases be distributed using different processors and memories. Use of the terms "processor" and "memory" in the singular herein encompasses computing devices that have only one processor or one memory as well as devices having multiple processors or memories that may each be used in the performance of some but not necessarily all recited steps.

For simplicity of explanation, process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 602, a block is selected from the plurality of blocks of a frame to be encoded. The frame may be one of a plurality of frames of a video stream to be encoded. Herein, select means to choose, indicate, mark, save or otherwise select in any fashion whatsoever. Blocks may be selected and processed in raster scan order, for example. In raster scan order, the blocks of a frame are selected starting at the upper left-hand corner of the frame and then are selected along rows starting at the left-hand margin and proceeding from left to right along each row from the top to the bottom of the frame.

At step 604, anchor points are selected for the current block. Each anchor point is adjacent to a corner of the current block. Desirably, the anchor points are equidistantly-spaced from the current block. Only three anchor points are needed as described in more detail below. However, four anchor points, each associated with one of the corners of the current block, may be selected initially. Once anchor points are selected, a motion search is performed using blocks associated with each of the anchor points at step 606. These blocks are referred to herein as template blocks to distinguish them from the block(s) to be predicted within the frame.

Figure 7:
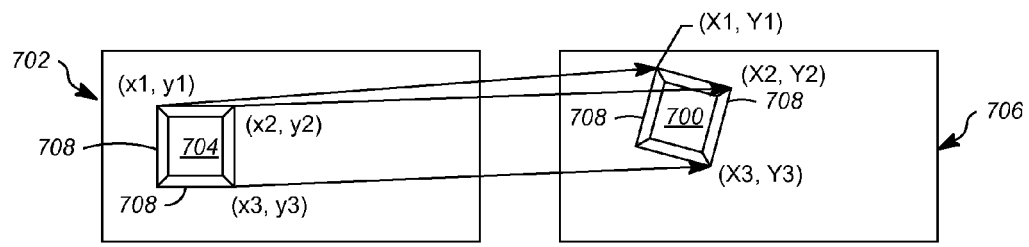
FIG. 7 is a diagram of a block and a reference block used to explain anchor points in the process of FIG. 6.

FIG. 7 is a diagram of a block and a reference block used to explain anchor points in the process of FIG. 6. In FIG. 7, current block 700 is located within a portion of a frame 702, and a reference block 704 is located within a portion of a reference frame 706. Reference frame 706 can be a constructed reference frame such as described in U.S. Pat. No. 8,385,404 or U.S. Pat. No. 8,503,528, for example, a so-called golden frame as is known in the art, or a last or future frame. Reference block 704 is also called prediction block 704 herein and it will be discussed below with reference to steps 608 and 610 of FIG. 6.

In FIG. 7, three anchor points are shown in relation to current block 700. Each of the anchor points is labeled by its pixel coordinates within frame 702. Pixel coordinates may be designated in X- and Y-coordinates or any other two-dimensional coordinate system. For example, the pixel position at the top left corner of the image frame could be designated as pixel position (0, 0) such that the pixel coordinates of the anchor points would be described relative to this pixel position. In this case, a first anchor point is at coordinates (x1, y1), a second anchor point is at coordinates (x2, y2), and a third anchor point is at coordinates (x3, y3). The anchor points as shown are equidistantly-spaced from corners of current block 700 as shown by spaced lines 708. Spaced lines 708 are located at a fixed pixel distance from each of the sides of current block 700. The pixel distance could be, for example, two or four pixels. The four intersecting points of spaced lines 708 are available as anchor points. Note that the coordinates may not correspond to an actual pixel position and may instead be a calculated position.

FIG. 7 shows three anchor points of current block 700 and additionally shows a fourth anchor point (unlabeled) that could be said to be at pixel position (x4, y4) of frame 702. The anchor points are centroids of template blocks located at the corners of current block 700.

Referring again to FIG. 6, at step 606, a motion search is performed on the blocks (i.e., the template blocks) associated with the at least three anchor points. Performed can mean determine, compute, process, calculate, execute or in any manner whatsoever perform the indicated function. As discussed above with reference to FIG. 4, a motion search finds a reference block. When only translational movement is assumed, the reference block is a contiguous group of pixels from a reference frame that conforms in size and shape to the selected block and most closely matches the pixel values in the selected block of the available candidate reference blocks. Motion searching can spatially translate pixels from a reference frame to bring them into registration with pixels from a selected block to permit the pixels from the reference frame to be used to predict the selected block. Pixels from the reference frame can be translated by several different values in X and Y and the degree to which the translated pixels match the pixels from the selected block determined. The translation values in X and Y that result from a motion search are referred to as a motion vector.

Figure 8:
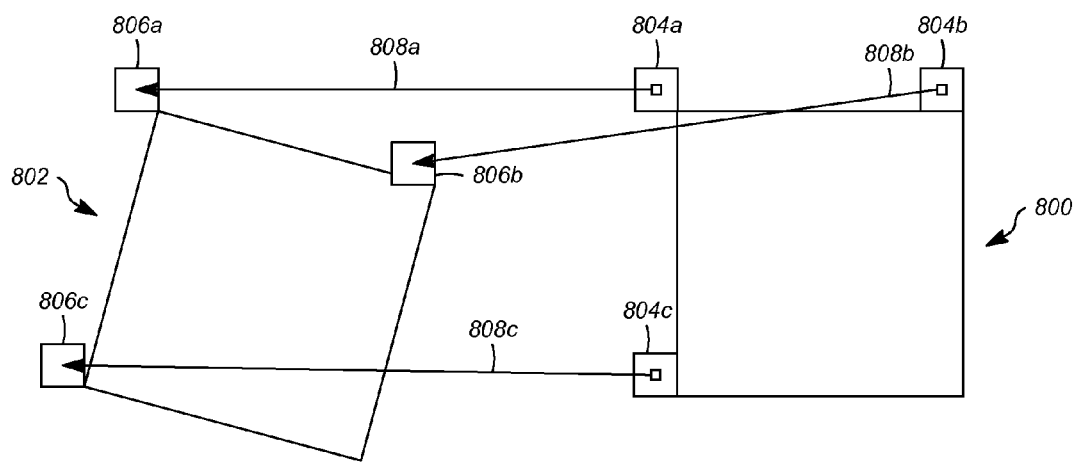
FIG. 8 is a diagram of a block and a reference block used to explain template blocks in the process of FIG. 6.

FIG. 8 is a diagram of a block and a reference block used to explain template blocks in the process of FIG. 6. FIG. 8 shows three template blocks 804a, 804b, 804c in this example. FIG. 8 omits the current frame, reference frame and anchor point coordinates for clarity. Each template block 804a, 804b, 804c has a central point, which is a respective anchor point of current frame 800. It is worth noting that the anchor points of FIG. 8 are located so that template blocks 804a, 804b, 804c are located adjacent to the outer edges of current frame 800 and in contact with a corner such that each template block 804a, 804b, 804c is a portion of a larger block that would already be predicted and reconstructed in raster scan order. Template blocks 804a, 804b, 804c are thus adjacent to the left-top, right-top and left-bottom corners of current block 800. In this way, reconstructed pixel values could be used in the calculations described herein for both current block 800 and reference block 802. Other positions and sizes for template blocks could be used, but it is desirable that they be consistent in size (e.g., square sizes) and placement relative to their anchor points (e.g., centered about) and that a corner of each template block is aligned with at least one edge of the current block with a corner in contact with a corner of the current block. This consistency simplifies calculations.

When a motion search is performed for template blocks 804a, 804b, 804c in FIG. 8, for example, three prediction blocks 806a, 806b, 806c result—one for each template block 804a, 804b, 804c. To distinguish them from conventional prediction blocks, prediction blocks 806a, 806b, 806c are referred to herein as template prediction blocks or template reference blocks.

Any technique for performing a motion search for each template block at step 606 is possible. The size and sample rate of the area over which the pixels will be translated are generally predefined by an encoder, but may be set by a user. While an exhaustive search of all possible matching blocks can be performed, it may be desirable to perform a fast motion search algorithm. One category of fast motion search algorithms involves an iterative process whereby, for the template block of interest, an initial area is searched by sampling a subset of candidate reference blocks with an initial step size. The one that is the most like the template block is selected to refine the search area in a next iteration. That is, the next iteration samples a subset of candidate reference block around the best matching block from the previous iteration with a reduced step size. This process can be repeated till step size goes to a minimum value such as one. In this process, the best matching candidate reference block may be determined by, for example, calculating the sum of absolute difference (SAD) of the pixels of the template block and the pixels of each candidate reference block translated by the associated motion vector so that the pixels are co-aligned. The reference block resulting in the lowest value for SAD may be selected as the best match for the template block. Another category of fast motion search algorithms is similar but calculates a sum of pixel values of the candidate reference block, compares it against the similar sum for the template block. If the difference between these sums is above a given threshold, checking the candidate block is skipped. Otherwise, a full check is performed using SAD or a similar comparison technique.

Regardless of the technique used for the motion search at step 606, the result includes a motion vector associated with a selected candidate block for each template block, which is the template prediction block for each template block, and a prediction error associated with the template prediction block and the template block. The prediction error is a measure of the difference between the template block and its associated template prediction block. The prediction error may be, for example, the SAD value described above.

The X- and Y-position translations represented by the motion vectors define the anchor points for the prediction block and are the centers of the template prediction blocks. For example, and referring to FIG. 8, a motion vector 808a for template block 804a centered about an anchor point at coordinates (x1, y1) defines an anchor point (X1, Y1), which is the centroid of a corresponding template prediction block 806a in reference frame 802. Similarly, a motion vector 808b for the template block 804b centered about an anchor point at coordinates (x2, y2) defines an anchor point (X2, Y2), which is the centroid of a corresponding template prediction block 806b in reference frame 802, and a motion vector 808c for the template block 804c centered about an anchor point at coordinates (x3, y3) defines an anchor point (X3, Y3), which is the centroid of a corresponding template prediction block 806c in reference frame 802. Each of the pairs of anchor points in the reference frame and current frame form an anchor point pair. Thus, (x1, y1), (X1, Y1) forms a first anchor point pair, (x2, y2), (X2, Y2) forms a second anchor point pair, and (x3, y3), (X3, Y3) forms a third anchor point pair.

With reference again to FIG. 6, process 600 describes using at least three anchor points (up to four anchor points)

at respective corners of the current block. At step 608, however, only three anchor points are used to calculate affine coefficients for an affine transformation. As mentioned briefly above, an affine transformation is a linear transform between the coordinates of two spaces defined by six affine coefficients. The affine transformation between two spaces is defined as follows:

$$x = a*X + b*Y + c;\text{ and}$$

$$y = d*X + e*Y + f;\text{ wherein}$$

(x, y) and (X, Y) are coordinates of two spaces; and
a, b, c, d, e, f are the affine coefficients and are real numbers.

Three pairs of anchor point correspondences between the current frame and the predictor frame provide two linear equations each. By solving the resulting six linear equations, the unknown values of the six affine coefficients may be found. Assuming the three anchor point pairs shown in FIG. 7 are used, the linear equations may be solved as follows using their coordinates at step 608:

$$\begin{Bmatrix} x1 \\ y1 \\ x2 \\ y2 \\ x3 \\ y3 \end{Bmatrix} = \begin{Bmatrix} a & b & 0 & 0 & 0 & 0 \\ d & e & 0 & 0 & 0 & 0 \\ 0 & 0 & a & b & 0 & 0 \\ 0 & 0 & d & e & 0 & 0 \\ 0 & 0 & 0 & 0 & a & b \\ 0 & 0 & 0 & 0 & d & e \end{Bmatrix} \begin{Bmatrix} X1 \\ Y1 \\ X2 \\ Y2 \\ X3 \\ Y3 \end{Bmatrix} + \begin{Bmatrix} c \\ f \\ c \\ f \\ c \\ f \end{Bmatrix}.$$

Which of the three possible anchor points associated with the current block to use to solve for the affine coefficients may be determined according to a variety of methods. For example, the three anchor points adjacent to the left-top, right-top and left-bottom corners of the current block may always be selected such that there is no motion search performed for a fourth anchor point. When blocks are processed in raster scan order, this assures that only reconstructed pixel values are used. In an alternative implementation, all four possible anchor points are selected at step 604, and a motion search performed for all at step 606. Then, the anchor point associated with the template block most different from its corresponding template prediction block (e.g., the motion search having the highest prediction error) is omitted from the calculation at step 608. Conversely, a test may be made for the three template blocks most similar to their respective template prediction blocks by, for example, comparing the prediction errors generated at step 606. The three anchor points for the three template blocks with the lowest prediction errors of the four anchor points would be selected for the calculation at step 608. In yet another implementation, different combinations of three of the four possible anchor points could be used to generate four different sets of affine coefficients at step 608.

Once the affine coefficients are known, the resulting affine transformation is used to generate a prediction block for the current block within the reference frame at step 610. More specifically, since the affine coefficients a, b, c, d, e, f are known, each pixel coordinate (X, Y) of the current block can be inserted into the affine transformation, x=a*X+b*Y+c and y=d*X+e*Y+f to produce pixel coordinates (x, y) for the prediction block in the reference frame. If more than one set of affine coefficients is produced at step 608, each resulting affine transformation may be used to generate a respective prediction block.

At step 612, a rate-distortion value is calculated that is associated with encoding the current block using the prediction block. For example, and referring to FIG. 7, a rate-distortion value would be calculated based on predicting current block 700 using prediction block 704 and encoding the residual. A rate-distortion value may be calculated for encoding the current block using each of the prediction blocks when more than one prediction block is generated at step 610.

At next step 614, a query is made as to whether more blocks are available for processing. If so, process 600 returns to step 602 to select the next block according to the scan order. If not, process 600 ends.

The rate-distortion value(s) for encoding the current block resulting at step 612 may be compared to the rate-distortion values for various intra prediction modes for the block to determine whether to encode the block using intra prediction or using inter prediction with a purely translational motion vector or using this local affine motion prediction scheme or mode. In general, the prediction mode resulting in the lowest rate-distortion value is used for encoding the block. For this reason, if multiple prediction blocks are generated at step 610 and used to calculate respective rate-distortion values at step 612, only the affine transformation resulting in the lowest rate-distortion value may be passed for consideration with rate-distortion values for other prediction modes.

In one implementation, a two-dimensional (or two one-dimensional) ADST (e.g., at transform stage 474) is applied to the affine motion prediction residual values resulting from differences between pixel values of the current block and pixel values of the prediction block when the local affine motion prediction scheme described herein is selected. This may be desirable, for example, because nearby pixels tend to be more correlated than those far apart in natural images. Where the template blocks are located near the top/left boundaries of the current block, pixels sitting close thereby are statistically better predicted. The variance of prediction residuals thus tends to vanish at these boundaries and gradually increase towards the far end. The spatial transform for the affine prediction residuals should possess such asymmetric properties. Since the basis function of the ADST vanish at the known prediction boundary and maximize at the far end, it should well capture the statistical patterns of the residuals. While DCT or another transform could be used, the basis functions of the conventional DCT reach their maximum energy at both ends and are agnostic to the statistical patterns of the prediction residuals, making them less efficient for the spatial transform of the affine prediction residuals.

After a transform is applied to the residual, the transform coefficients may be quantized and entropy coded as described above before being packetized into an encoded bitstream. When a block is encoded using affine transformation as described herein, bits may be added to the bitsteam in the frame header, slice header and/or block header so as to indicate that the local affine motion prediction mode is being used. In addition, a motion vector, rotation angle and/or a scale factor may be derived from the affine transformation according to known techniques and sent within the bitstream so that the decoder can reconstruct the predicted block.

In operation, the decoder receives the encoded block data from the bitstream, including the information needed to decode the block. The block data is entropy decoded and then dequantized. The resulting dequantized transform coefficients are subject to inverse transformation (e.g., using ADST) to generate residual values. The information regarding the prediction mode, including the motion vector, rotation angle and/or scale factor are used to generate the prediction block used to predict the block, which is then added to the residual to reproduce the block.

Block matching motion estimation with translational motion vectors is computationally efficient and performs well when motion in a series of video frames is mild. However, it often provides poor predictions for complex motion patterns through the assumption that every pixel in a block undergoes the same motion. Affine transformation can capture more complex motion. However, existing techniques that employ affine motion prediction rely upon motion vectors for adjacent blocks to the current block. This requirement is not always satisfied in practice as nearby blocks may adopt intra prediction modes.

In contrast, the teachings herein model complex motion more effectively by using a local affine motion prediction scheme. The local affine motion prediction scheme fits an affine transformation between the current block to be predicted and its reference frame. The affine coefficients are estimated using reconstructed pixels adjacent to the block, eliminating the need to send additional overhead related to motion vectors of nearby blocks. Desirably, ADST is used for the resulting prediction residual as better conforming to its signal statistics. The local affine motion prediction scheme can result in better prediction, and hence better compression, than translational-only inter prediction modes for some blocks either alone or in combination with using ADST in the transform stage of the encoder.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 112 and receiving station 130 can, for example, be implemented on computers in a video conferencing system. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. For example, receiving station 130 can be a generally stationary personal computer rather than a portable communications device and/or a device including an encoder 470 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method of encoding a video frame, comprising:
   selecting at least three points within the video frame, each point of the at least three points adjacent to a respective corner of a current block to be encoded, the current block being one of a plurality of blocks of the video frame;
   for each point of the at least three points, performing a motion search for a template block centered about the point within a reference frame to find a template reference block, the template reference block having a center point forming an anchor point pair with the point of the at least three points;
   using coordinates of the anchor point pairs, generating affine coefficients for an affine transformation;

using the affine transformation, generating a prediction block for the current block; and encoding, using a processor, the current block within an encoded bitstream using the prediction block.

2. The method of claim 1 wherein each template block comprises a square block in contact with a respective corner of the current block and aligned with at least one edge of the current block.

3. The method of claim 1 wherein encoding the current block comprises:

generating a residual block as a difference between pixel values of the current block and pixel values of the prediction block;

applying a transform to the residual block to generate a plurality of transform coefficients;

quantizing the plurality of transform coefficients to generate a plurality of quantized transform coefficients; and entropy coding the plurality of quantized transform coefficients for inclusion within the encoded bitstream.

4. The method of claim 3 wherein applying the transform to the residual block comprises applying a two-dimensional Asymmetrical Discrete Sine Transform to the residual block.

5. The method of claim 1 wherein generating the affine coefficients comprises solving six linear equations using the coordinates of only three anchor point pairs.

6. The method of claim 5, further comprising:

selecting the only three anchor point pairs by omitting a fourth point of the at least three points whose template reference block results in a highest prediction error as a result of the motion search.

7. The method of claim 1, further comprising:

calculating a prediction error for each template block based on the template reference block found for the template block in the motion search; and selecting three points of the at least three points based on the template blocks having the lowest prediction errors; and wherein generating the affine coefficients comprises solving six linear equations using the coordinates of three anchor point pairs including the three points.

8. The method of claim 1 wherein:

selecting the at least three points within the video frame comprises selecting four points;

generating the affine coefficients for the affine transformation comprises generating affine coefficients for different combinations of the anchor point pairs based on the four points to produce a plurality of affine transformations;

generating the prediction block for the current block comprises generating a plurality of prediction blocks, each prediction block generate using one of the plurality of affine transformations; and encoding the current block using the prediction block comprises encoding the current block using one of the plurality of prediction blocks.

9. The method of claim 8 wherein encoding the current block using one of the plurality of prediction blocks comprises encoding the current block using the one of the plurality of prediction blocks resulting in a lowest rate-distortion value.

10. The method of claim 1 wherein encoding the current block using the prediction block comprises encoding a residual of the current block and the prediction block using a two-dimensional Asymmetrical Discrete Sine Transform.

11. An apparatus for encoding a video frame, comprising:
a memory; and
a processor configured to execute instructions stored in the memory to:

select at least three points within the video frame, each point of the at least three points adjacent to a respective corner of a current block to be encoded, the current block being one of a plurality of blocks of the video frame;

for each point of the at least three points, perform a motion search for a template block centered about the point within a reference frame to find a template reference block, the template reference block having a center point forming an anchor point pair with the point of the at least three points;

using coordinates of the anchor point pairs, generate affine coefficients for an affine transformation;

using the affine transformation, generate a prediction block for the current block; and encode the current block within an encoded bitstream using the prediction block.

12. The apparatus of claim 11 wherein each template block comprises a square block in contact with a respective corner of the current block and aligned with at least one edge of the current block.

13. The apparatus of claim 11 wherein the processor is configured to encode the current block by:

generating a residual block as a difference between pixel values of the current block and pixel values of the prediction block;

applying a transform to the residual block to generate a plurality of transform coefficients;

quantizing the plurality of transform coefficients to generate a plurality of quantized transform coefficients; and entropy coding the plurality of quantized transform coefficients for inclusion within the encoded bitstream.

14. The apparatus of claim 13 wherein the processor is configured to apply the transform to the residual block by applying a two-dimensional Asymmetrical Discrete Sine Transform to the residual block.

15. The apparatus of claim 11 wherein the processor is configured to generate a single set of the affine coefficients by solving six linear equations using the coordinates of only three anchor point pairs.

16. The apparatus of claim 15 wherein the processor is configured to select the only three anchor point pairs to generate the single set by:

omitting a fourth point of the at least three points whose template reference block results in a highest prediction error as a result of the motion search.

17. The apparatus of claim 11 wherein the processor is configured to:

calculate a prediction error for each template block based on the template reference block found for the template block in the motion search;

select three points of the at least three points based on the template blocks having the lowest prediction errors; and generate the affine coefficients by solving six linear equations using the coordinates of three anchor point pairs including the three points.

18. The apparatus of claim 11 wherein the processor is configured to:

select the at least three points within the video frame by selecting four points;

generate the affine coefficients for the affine transformation by generating affine coefficients for different combinations of the anchor point pairs based on the four points to produce a plurality of affine transformations;

generate the prediction block for the current block by generating a plurality of prediction blocks, each prediction block generate using one of the plurality of affine transformations; and encode the current block using the prediction block by encoding the current block using one of the plurality of prediction blocks.

19. The apparatus of claim 18 wherein the processor is configured to encode the current block using one of the plurality of prediction blocks by encoding the current block using the one of the plurality of prediction blocks resulting in a lowest rate-distortion value.

20. The apparatus of claim 19 wherein the processor is configured to encode the current block by encoding a residual of the current block and the one of the plurality of prediction blocks using a two-dimensional Asymmetrical Discrete Sine Transform.

\* \* \* \* \*